United States Patent
Wang

(10) Patent No.: US 10,920,026 B2
(45) Date of Patent: *Feb. 16, 2021

(54) POLYMER COMPOSITION, MOLDED PART AND PROCESSES FOR PRODUCTION THEREOF

(71) Applicant: DSM IP Assets B.V., Heerlen (NL)

(72) Inventor: Zhujuan Wang, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/336,161

(22) PCT Filed: Sep. 27, 2017

(86) PCT No.: PCT/EP2017/074533
§ 371 (c)(1),
(2) Date: Mar. 25, 2019

(87) PCT Pub. No.: WO2018/060271
PCT Pub. Date: Apr. 5, 2018

(65) Prior Publication Data
US 2019/0225760 A1   Jul. 25, 2019

(30) Foreign Application Priority Data

Sep. 28, 2016 (EP) .................... 16191041

(51) Int. Cl.
| | |
|---|---|
| *C08J 5/04* | (2006.01) |
| *C08L 77/06* | (2006.01) |
| *C08G 73/10* | (2006.01) |
| *C08J 3/20* | (2006.01) |
| *B29C 45/27* | (2006.01) |
| *B29K 77/00* | (2006.01) |
| *B29K 309/08* | (2006.01) |

(52) U.S. Cl.
CPC .......... *C08J 5/043* (2013.01); *C08G 73/1082* (2013.01); *C08J 3/201* (2013.01); *C08L 77/06* (2013.01); *B29C 45/2708* (2013.01); *B29K 2077/00* (2013.01); *B29K 2309/08* (2013.01); *C08J 2377/06* (2013.01)

(58) Field of Classification Search
None
See application file for complete search history.

(56) References Cited

U.S. PATENT DOCUMENTS

| 5,302,691 A | 4/1994 | Soelch |
|---|---|---|
| 5,322,923 A | 6/1994 | Lahary et al. |
| 5,387,645 A | 2/1995 | Montag et al. |
| 10,017,628 B2 | 7/2018 | Hoekstra et al. |
| 2012/0027983 A1 | 2/2012 | Elia |
| 2016/0152800 A1* | 6/2016 | Hoekstra ............... C08K 3/013 524/133 |

FOREIGN PATENT DOCUMENTS

CN   105377946   3/2016

OTHER PUBLICATIONS

International Search Report for PCT/EP2017/074533, dated Dec. 18, 2017, 3 pages.
Written Opinion of the ISA for PCT/EP2017/074533, dated Dec. 18, 2017, 6 pages.

* cited by examiner

*Primary Examiner* — Ana L. Woodward
(74) *Attorney, Agent, or Firm* — Nixon & Vanderhye P.C.

(57) ABSTRACT

The present invention relates to a polymer composition, consisting of (A) 30-90 wt. % of at least one thermoplastic polymer comprising at least a semi-crystalline semi-aromatic polyamide (SSPA-1) in an amount in the range of 30-90 wt. %; (B) 10-70 wt. % of at least one reinforcing agent, and (C) 0-25 wt. % of one or more other components; wherein the SSPA-1 consists of (A-1-a) 90-100 wt. % of repeat units derived from (i) an aromatic dicarboxylic acid and (ii) diamines, and (A-1-b) 0-10 wt. % of repeat units derived from other monomers; the diamines (ii) consist of 80-95 mole % of a linear aliphatic diamine, 5-20 mole % of 2-methyl-pentamethylene diamine, and 0-10 mole % of other diamines; and the SSPA-1 has a melting temperature (Tm) of at least 300° C. The invention further relates to a molded part made of the composition, a process for making the composition and a process for making the molded part.

16 Claims, No Drawings

POLYMER COMPOSITION, MOLDED PART AND PROCESSES FOR PRODUCTION THEREOF

This application is the U.S. national phase of International Application No. PCT/EP2017/074533 filed 27 Sep. 2017, which designated the U.S. and claims priority to EP Patent Application No. 16191041.9 filed 28 Sep. 2016, the entire contents of each of which are hereby incorporated by reference.

The present invention relates to filled or reinforced thermoplastic polymer composition and molded parts made thereof. More particular, the invention relates to a polymer composition comprising a semi-crystalline semi-aromatic polyamide. The present invention also relates to a process for preparing the polymer composition and to a process for producing the molded part.

Semi-crystalline semi-aromatic polyamides, in particular those with a high melting temperature, are used more and more in applications with either a high temperature, or a high mechanical load, or a combination thereof. Such applications are found, for example, in the field of automotive under the hood applications, such a structural parts bearing high mechanical loads, and parts close to the engine bearing mechanical loads under elevated temperature, as well as in the field of electronic applications, such as structural parts in e.g. housings and frames, as well as in electronic components where molded parts are subjected to peak loadings in terms of temperature peaks and/or mechanically forces.

A problem with molded parts made from reinforced thermoplastic polymer compositions based on semi-crystalline semi-aromatic polyamide (also referred to herein by the abbreviation SSPA) is that these either lack sufficient mechanical strength at elevated temperature, or fail in mechanical properties at weldlines, or both. It is a well-known fact that weldlines (also called knit lines) are unavoidable in most injection-molded products of even moderate complexity. In an injection molded structural plastic part, a weld line will result in a region of mechanical weakness as soon as the part is submitted to load. As described by S. Fellahi et al in Advances in Polymer Technology, volume 14 issue 3, 8 Apr. 2003: "Weldlines represent a potential source of weakness in molded parts. In injection molding weldlines are generated when two separate melt streams join either in multigated molds or as a consequence of flow around obstacles. The development of many interesting materials has been hampered by poor weldline strength. Among such materials are plastics reinforced with fibers or platelets, liquid crystal polymers, and a number of multiphase polymer blends."

Reinforced polymer compositions having improved weld line strength are mentioned, for example, in WO-08076476-A1. The compositions of WO-08076476 A1 comprise a high heat thermoplastic resin and glass fiber. In particular, the high heat thermoplastic resin consists of polyetherimide, while a second resin selected from polycarbonate, polycarbonate ester, polyester, polyamide, and combinations thereof may be present. According to WO-08076476-A1 plastic materials (polymers) able to withstand high temperatures are useful in a wide variety of applications. For example, it has long been desired to use reinforced high temperature plastic materials to replace metal in many articles. To be successful, the reinforced plastic material must have good mechanical properties and excellent dimensional stability, even at high temperatures. For example, such plastic materials need enough weldline strength to resist breakage during secondary operations. A weldline is formed in an area where two or more molten polymer fronts meet during the production of an article. For example, weldlines can be formed when molten polymer is injected into a mold from two different locations. A weldline is usually the weakest area in a molded article and generally is the first to fail when the article is exposed to force. The compositions of WO-08076476-A1 comprise a particulate glass filler having a coating comprising urethane groups and an aminosilane to improve the weldline strength.

Similar problems are observed with so-called filled or reinforced polymer composition comprising a semi-crystalline semi-aromatic polyamide.

The aim of the present invention is therefore to provide a polymer composition having an improved balance in mechanical properties at elevated temperature and mechanical strength at weldlines.

This aim has been achieved with the reinforced thermoplastic polymer composition according to the invention, consisting of:
(A) polymer comprising at least a first semi-crystalline semi-aromatic polyamide (SSPA-1);
(B) 10-70 wt. % of at least one reinforcing agent, and
(C) 0-25 wt. % of one or more other components.
In the composition according to the invention, the SSPA-1
is present in an amount in the range of 30-90 wt. %;
has a melting temperature (Tm) of at least 300° C.; and
consists of:
(A-1-a) 90-100 mole % of repeat units derived from (i) aromatic dicarboxylic acid and (ii) diamines, and
(A-1-b) 0-10 mole % of repeat units derived from other monomers;
and the diamines (ii) consist of 80-95 mole % of linear aliphatic diamine, 5-20 mole % of 2-methyl-pentamethylene diamine, and 0-10 mole % of other diamines.
Herein
the mole percentages of the diamines of which the diamines (ii) consist, are relative to the total molar amount of diamines (ii) in the SSPA-1;
the mole % of (A-1-a) is based on the combined molar amount of the aromatic dicarboxylic acid (i) and the diamines (ii);
the mole % of (A-1-a) and (A-1-b) are relative to the total molar amount of monomeric repeat units (A-1-a) and (A1-b) in the SSPA-1;
the weight percentages (wt. %) of components (A), (B) and (C) and of the SSPA-1 are relative to the total weight of the composition, while the sum of (A), (B) and (C) is 100 wt. %.

With the term "composition" in the expression "relative to the total weight of the composition" is herein meant the reinforced thermoplastic polymer composition.

The effect of the combination of the high amount of aromatic dicarboxylic acid, the high amount of linear aliphatic diamine and the presence of 2-methyl-pentamethylene diamine in relatively low amount, and the high melting temperature, is that the polymer composition has high mechanical strength at high temperature as well as a high weldline strength for molded parts at room temperature. In fact, compared to corresponding high melting compositions not comprising 2-methyl-pentamethylene diamine, the weldline strength with the compositions according to the invention is higher, while the tensile strength at high temperature remains at a high level. This result is highly surprising since further increasing the amount of 2-methyl-pentamethylene diamine results in a significant drop in tensile strength at high temperature and lower weldline strength at room temperature.

Though the use of 2-methyl-pentamethylene diamine as a comonomer in polyamides is known, it is generally used in, or mentioned as an optional comonomer in copolyamides, in combination with other monomers, and is either used in relative large amount, or is used in copolymers comprising a relative large amount of aliphatic dicarboxylic acid or isophthalic acid, or in combination with diamines or diamine mixtures, resulting in polyamides with a relative low melting point.

For example, U.S. Pat. No. 5,378,800 describes copolyamides of aliphatic diamines and aromatic dicarboxylic acid, wherein the aromatic dicarboxylic acid is terephthalic acid, or a mixture of terephthalic acid and less than 40 mole % isophthalic acid, and the aliphatic diamine is a mixture of at least 40 mole % of hexamethylene diamine and 2-methyl-pentamethylene diamine, wherein the combined amount of isophthalic acid and 2-methyl-pentamethylene diamine is in the range of 15-35 mole %, relative to the total amount of aliphatic diamines and aromatic dicarboxylic acid. In the copolyamides of U.S. Pat. No. 5,378,800, either a high amount of 2-methyl-pentamethylene diamine (30-40 mole % on total diamine) is used, or a high amount of isophthalic acid (40 mole % on total aromatic dicarboxylic acid) in combination with a low melting temperature is used.

In US20080274355A1 PA6T/10 copolyamides are described which may comprise further comonomers, amongst which 2-methyl-pentamethylene diamine is mentioned. No specific examples have been mentioned, but the melting temperature of these PA6T/10 copolyamides is already relative low, typically around 280-300° C., which will lower further upon addition of 2-methyl-pentamethylene diamine.

The use of 2-methyl-pentamethylene diamine as a comonomer in a relative small amount in copolyamides with a high melting temperature, and the effect thereof in the weldline strength at room temperature and a significant drop in tensile strength at high temperature is not revealed.

Suitably, the melting temperature of the semi-crystalline semi-aromatic polyamide (SSPA-1) is suitably in the range of 300-350° C. In a preferred embodiment of the polymer composition according to the invention, SSPA-1 has a melting temperature in the range of 310-340° C. In a more preferred embodiment, said melting temperature is in the range of 315-350° C. The advantage of the higher melting temperature is that the high temperature properties are better retained, while at the same time a good weldline strength is obtained.

With the term melting temperature is herein understood the temperature, measured by the differential scanning calorimetry (DSC) method according to ISO-11357-1/3, 2011, on pre-dried samples, in an N2 atmosphere with heating and cooling rate of 10° C./min. Herein Tm has been calculated from the peak value of the highest melting peak in the second heating cycle.

Semi-crystalline polymers typically have a morphology comprising crystalline domains, characterized by a melting temperature and a melting enthalpy, and amorphous domains characterized by a glass transition temperature.

With the term semi-crystalline in semi-crystalline polyamide is herein understood that the polyamide has a melting temperature (Tm) and a melting enthalpy ($\Delta$Hm), as well as a glass transition temperature (Tg). Suitably the semi-crystalline polyamide has a melting enthalpy of at least 5 J/g, preferably at least 10 J/g, and even more preferably at least 25 J/g.

With the term melting enthalpy ($\Delta$Hm) is herein understood the melting enthalpy, measured by the DSC method according to ISO-11357-1/3, 2011, on pre-dried samples in an N2 atmosphere with heating and cooling rate of 10° C./min. Herein ($\Delta$Hm) has been calculated from the surface under the melting peak in the second heating cycle.

With the term thermoplastic in reinforced thermoplastic composition is herein understood that the composition can be prepared by a melt mixing process and that the composition can be melt-processed for making molded parts.

With the term semi-aromatic in semi-aromatic polyamide is herein understood that the polyamide is derived from a combination of monomers comprising aromatic monomers, i.e. monomers comprising an aromatic unit, and non-aromatic monomers, i.e. monomers not comprising an aromatic group.

The SSPA-1 in the composition according to the invention comprises repeat units derived from aromatic dicarboxylic acid (i) and diamines (ii). Herein the aromatic dicarboxylic acid may consist of a single aromatic dicarboxylic acid or alternatively consist of a mixture of at least two aromatic dicarboxylic acids. The aromatic dicarboxylic acid in the SSPA-1 suitably comprises an aromatic dicarboxylic acid selected from terephthalic acid, 2,6'-naphthalene dicarboxylic acid and 4,4'-biphenyl dicarboxylic acid, or a combination thereof. Preferably, the aromatic dicarboxylic acid comprises the selected dicarboxylic acids in an amount in the range of 70-100 mole %, more preferably 80-100 mole %, still more preferably 90-100 mole %, relative to the total molar amount of aromatic dicarboxylic acid, and even better fully consists of the selected dicarboxylic acids. The advantage of the aromatic dicarboxylic acid comprising a higher amount, or better consisting of the selected components is that mechanical properties at high temperature are better retained.

In a preferred embodiment, the aromatic dicarboxylic acid comprises, or even better consists of terephthalic acid.

The diamines in the SSPA-1 in the polymer composition according to the invention consist of 80-95 mole % of a linear aliphatic diamine, 5-20 mole % of 2-methyl-pentamethylene diamine, and 0-10 mole % of other diamines, relative to the total molar amount of diamines.

Herein, the linear aliphatic diamine can in principle be a single diamine or a mixture of any combination of different linear aliphatic diamines, as long as the melting temperature of the SSPA-1 is at least 300° C. Suitably, the linear aliphatic diamine comprises a C2-C12 diamine (i.e. from 1,2-diaminoethane up to and including 1,12-dodecane diamine), more preferably a C4-010 diamine.

In a preferred embodiment, the linear aliphatic diamine consists of a C4-010 diamine, i.e. from butane-1,4-diamine up to and including 1,10-decane diamine). In another preferred embodiment, the linear aliphatic diamine consists of a mixture of a C2-C8 diamine (i.e. from 1,2-diaminoethane up to and including 1,8-octane diamine), and a second linear aliphatic diamine, or of a C2-C8 diamine and a second and third linear aliphatic diamine. Herein the second or third, or both the second and third diamine may be a C2-C8 diamine as well, or may be a longer diamine. More preferably, the linear aliphatic diamine consists of a mixture of a C4-C6 diamine and a second linear aliphatic diamine, or of a C4-C6 diamine and a second and third linear aliphatic diamine. Herein the second or third, or both the second and third diamine may be a C4-C6 diamine as well, or may be a longer diamine.

Linear C2-C8 diamines are the following: 1,2-diaminoethane (synonym: 1,2-ethylene diamine; 2 carbons); 1,3-diaminopropane (synonym: propane-1,3-diamine or 1,3-propylene diamine; 3 carbons); butane-1,4-diamine (synonym for 1,4-butane diamine; 4 carbons); pentane-1,5-diamine (synonym for 1,5-pentane diamine; 5 carbons); hexamethylenediamine (synonym: hexane-1,6-diamine or 1,6-hexane diamine; 6 carbons), heptamethylene diamine (synonym: heptane-1,7-diamine or 1,7-heptane diamine) and octamethylene diamine (synonym: octane-1,8-diamine or 1,8-octane diamine). Examples of other linear diamines are 1,9-nonane diamine, 1,10-decane diamine, 1,11-undecane diamine, 1,12-dodecane diamine.

Preferably, the linear diamines comprise 40-95 mole %, more preferably 60-95 mole % of a C2-C8 diamine, relative to the total molar amount of diamines. More preferably, the linear diamines comprise 40-95 mole %, more preferably 60-95 mole % of a C2-C6 diamine, relative to the total molar amount of diamines. Herein, and above, the C2-C8 diamine, may consist of one diamine, or of a mixture of two or more diamines. The same holds for the C2-C6 diamine. For example, the C2-C6 diamine consists of a mixture of 1,4-butane diamine and 1,6-hexane diamine. The advantage of a higher content in such short chain diamines is that the high temperature properties are better retained while still a very good weld strength is obtained.

Other diamines that may be comprised in the SSPA-1, up to and including an amount of 10 mole %, relative to the total molar amount of diamines, include: other branched aliphatic diamines, alicyclic diamines, aralkyl diamines and aromatic diamines, and any mixture thereof.

Suitable aromatic diamines are, for example, metaphenylene diamine and paraphenylene diamine. Aralkyl diamines are diamines with aliphatic amine groups and an aromatic group. Examples thereof are m-xylylene diamine (MXDA) and p-xylylene diamine (PXDA). Examples of suitable alicyclic diamines are 1,4-cyclohexane diamine and 1,4-diaminomethylcyclohexane. Examples of other branched aliphatic diamines are 2,2,4-trimethylhexamethylenediamine, 2,4,4-trimethylhexamethylenediamine and 2-methyl-1,8-octane diamine.

The other diamines in the SSPA-1 are preferably limited to an amount in the range of 0-5 mole %, more preferably 0-2.5 mole %, and most preferably 0-1 mole %.

The diamines (ii) in the SSPA-1 preferably consist of 85-95 mole % of a linear aliphatic diamine, 5-15 mole % of 2-methyl-pentamethylene diamine, and 0-5 mole % of other diamines.

The SSPA-1 optionally comprises repeat units derived from one or more monomers other than the diamines and aromatic dicarboxylic acid. The amount thereof, if any is at most 5 mole %, relative to the total amount of repeat units derived from diamines, aromatic dicarboxylic acid and the other monomer, or other monomers. Examples thereof are aliphatic dicarboxylic acids and monofunctional monomers, used as chain stoppers, and trifunctional monomers, used as branching agents.

Preferably, the amount of such other repeat units is at most 2 mole %, and eventually even at most 0.5 mole %, relative to the total amount of repeat units.

Also preferably, the other monomers, if present at all, consist of monofunctional monomers, or trifunctional monomers, or a combination thereof.

The polymer in the reinforced thermoplastic polymer composition according to the invention, also referred to herein as component (A), comprises at least the first semi-crystalline semi-aromatic polyamide (SSPA-1) as defined here above. Component (A) may comprise one or more polymers other than the SSPA-1, provided that the total amount of component (A) in the composition remains within the range of 30-90 wt. %, and that the amount of the SSPA-1 is at least 30 wt. %, relative to the total weight of the composition. Alternatively, component (A) may fully consist of the SSPA-1.

In one embodiment of the invention, the polymer consist of the SSPA-1. In other words, the SSPA-1 can be present herein in an amount of 30-90 wt. %, relative to the total weight of the composition.

Suitably, the amount of the SSPA-1 is in the range of 35-85 wt. %, preferably in the range of 40-80 wt. %, more preferably 45-70 wt. %, relative to the total weight of the composition.

Also suitably, the amount of the one or more other polymers, if present at all, is in the range of 0-30 wt. %, preferably 0-20 wt. %, more preferably 0-10 wt. %, relative to the total weight of the composition.

As the one or more other polymers, component (A) suitably comprises one or more polymers selected from the group of polyamides, such as semi-crystalline polyamides having a melting temperature below 300° C. and amorphous polyamide, semi-crystalline polyesters, liquid crystalline polymers, PPS and PEI.

The other polymer preferably comprises or even consists of a semi-crystalline polyamide having a melting temperature below 300° C., or an amorphous polyamide, or a combination thereof. More preferably, the other polymer, if present at all, consists of such polyamide or combination thereof, and the amount thereof is in the range of 0-20 wt. %, preferably 0-15 wt. %, more preferably 0-10 wt. %, relative to the total weight of the composition.

The composition according to the invention suitable comprises as reinforcing agent, also referred to as component (B), at least one component selected from reinforcing fibers and inorganic fillers, or a combination thereof. Herein a wide range of fibers and fillers may be used. Examples of such fillers include, but are not limited to, silica, metasilicates, alumina, talc, diatomaceous earth, clay, kaolin, quartz, glass, mica, titanium dioxide, molybdenum disulphide, gypsum, iron oxide, zinc oxide, powdered polytetrafluoroethylene, montmorillonite, calcium carbonate, glass powder and glass beads.

As reinforcing fibers, for example aromatic fibers as well as inorganic fibers may be used. Preferably, inorganic fibers are used. Examples thereof are glass fibers, carbon fibers, boron fibers, ceramic fibers and whiskers of wollastonite and potassium titanate.

In a preferred embodiment of the invention, the reinforcing agent in the polymer composition comprises, or even consists of inorganic fibers or inorganic fillers, or a combination thereof.

Preferably, the reinforcing agent (component (B)) comprises glass fibers or carbon fibers. More preferably glass fibers are used. These glass fibers may be of various composition and shape, for example, S-glass, E-glass and basalt glass, as well as round glass and flat glass fibers.

The total amount of component (B) is in the range of 10-70 wt. %, preferably in the range of 20-60 wt. %, more preferably 30-55 wt. %, relative to the total weight of the composition. Component (B) consists of at least reinforcing agent. For determining the total amount of component (B), the amounts of any and all reinforcing agent in the composition are combined.

With the minimum amount of 30 wt. % for SSPA-1, the maximum amount of component (B) is at most 70 wt. %, relative to the total weight of the composition. When the minimum amount for SSPA-1 is higher and/or the minimum amount of component (C) is higher than 0 wt. %, as for certain preferences or preferred embodiments of the invention, the maximum total amount of component (B) is lower, such that the sum of (A), (B) and (C) being 100 wt. %, is still complied with.

The polymer composition may comprise one or more other components (component (C)), different from the polymer (component (A)), and the reinforcing agent (component (B)). As component (C), any auxiliary additive used polyamide molding compositions may be used.

It is noted that the terms "one or more" and "at least one" are herein meant to have the same meaning and can be used interchangeably. When the amount of a component can be 0 wt. %, for example, when the component is present in an amount in a range starting from 0 wt. %, the amount of 0 wt. % it is to be understood that no such component is present at all.

Suitable additives include stabilizers, flame retardants, plasticizers, conductive and/or anti-static agents, lubricants and mold release agents, nucleating agents, dyes and pigments, and any other auxiliary additives that may be used in polyamide compositions. Examples of heat stabilizers include copper (I) halides e.g. copper bromide and copper iodide, and alkali halides e.g. lithium, sodium and potassium bromides and iodides.

The amount of component (C), i.e. total amount of such other components, is in the range of 0-25 wt. %, relative to the total weight of the composition. Suitably the amount is from 0.01 upto 7.5 wt. %, more particular in the range of 0.1-5 wt. %, for example when no flame retardant is present, or from 7.5 upto and including 25 wt. %, more particular in the range of 10-20 wt. %, for example when a flame retardant is present.

The present invention also relates to a process for preparing a polymer composition according to the invention, and any particular or preferred embodiment thereof, as described here above. This process comprises steps of:

(1) providing
polymer comprising at least a first semi-crystalline semi-aromatic polyamide (SSPA-1), and
at least one reinforcing agent, and optionally
one or more other components,
and
(2) melt-mixing the said components in the following amounts:
(A) the polymer comprising 30-90 wt. of the first semi-crystalline semi-aromatic polyamide (SSPA-1)
(B) 10-70 wt. % of the least one reinforcing agent, and
(C) 0-25 wt. % of the one or more other components, wherein the SSPA-1
has a melting temperature (Tm) of at least 300° C.; and consists of:
(A-1-a) 90-100 mole % of repeat units derived from (i) aromatic dicarboxylic acid and (ii) diamines, and
(A-1-b) 0-10 mole % of repeat units derived from other monomers;
and the diamines (ii) consist of 80-95 mole % of linear aliphatic diamine, 5-20 mole % of 2-methyl-pentamethylene diamine, and 0-10 mole % of other diamines;
and wherein
the mole percentages (mole %) of the diamines are relative to the total molar amount of diamines;
the mole % of (A-1-a) is based on the combined molar amount of the aromatic dicarboxylic acid (i) and the diamines (ii);
the mole % of (A-1-a) and (A-1-b) are relative to the total molar amount of monomeric repeat units (A-1-a) and (A-1-b) in the SSPA-1;
the weight percentages (wt. %) of components (A), (B) and (C) and of the SSPA-1 are relative to the total weight of the composition, while the sum of (A), (B) and (C) is 100 wt. %.

The types and amount of the various components applied in the process according to the invention and the polymer composition prepared by the process according to the invention is suitably adopted for preparing any particular or preferred embodiment of the polymer composition according to the invention, as described here above.

For the melt mixing process, standard compounding equipment and standard melting mixing procedures can be applied. Suitably, the melt mixing process is carried out in an extruder, more particular in a twin-screw extruder.

After the melt mixing, the resulting composition can be further processed. The further processing is not limited to any particular process, and may be any process suitable for thermoplastic compositions. Suitably, after the melt-mixing step (2), the composition is cooled and granulated. For this purpose any conventional cooling and granulation process may be used, for example, forming strand by extrusion and cooling and cutting the strands into granules. Alternatively, the composition may be injection molded to produce a molded part.

The present invention further relates to a molded part and to a process for making a molded part. The molded part is made, or comprises an element made of a polymer composition according to the present invention, or any preferred or special embodiment thereof.

The molded part may be an automotive part, for example a load bearing part or an engine part, or a part of an electronic device, for example a part of housing or a frame.

The process for making a molded part comprises a step of injection molding of a polymer composition into a mold, wherein the polymer composition is a polymer composition according to the present invention, or any preferred or special embodiment thereof. Herein the mold has a cavity for shaping the molded part, or an element thereof, from the polymer composition. Herein the molded part may comprise one or more other elements, for example made of metal or another material, which is overmolded with the polymer composition. The molded part may also comprise an element made of the polymer composition, assembled together with one or more other elements, for example made of metal or another material, thus together constituting the molded part.

The formation of weldlines and the problem of limited weldline strength can normally already occur with single-gate molds. This problem is reduced with the compositions according to the invention applied in the process according to the invention. The formation of weldlines is unavoidable in a mold with a multi-gate cavity (multi-gate mold) and the problem of limited weldline strength is normally further enhanced. With the compositions according to the invention applied in the process according to the invention employing such a multi-gate mold this problem is reduced in a larger extend.

For the injection molding process, standard injection molding equipment and standard injection molding procedures can be applied. Suitably, the injection molding process is carried out employing an extruder, more particular a single-screw extruder. Preferably, the mold employed in this process is a mold with a multi-gate cavity.

In a particular embodiment of the present invention the molded part, in particular an automotive part, for example a load bearing part or an engine part, or a part of an electronic device, for example a part of housing or a frame, or an element thereof, is made in a mold with a multi-gate cavity.

The invention is further illustrated with the following non-limiting examples and comparative experiments.
Materials
PA-1 PA-6T/DT (60/40 molar ratio): Zytel HTN51G45HSL, glass fiber reinforced grade (commercially available from DuPont)
PA-2 PA-6T/4T copolymer (65/35 molar ratio) (made by DSM)
PA-3 PA-6T/4T/DT copolymer (58/32/10 molar ratio) (made by DSM)
Herein the polyamides consist of repeat units derived from respectively: 1,6-hexanediamine and terephthalic acid (abbreviated as 6T), 1,4-butanediamine and terephthalic acid (abbreviated as 4T), and 2-methyl-pentamethylene diamine and terephthalic acid (abbreviated as DT).
Compounding
Polyamide compositions were prepared on a twin screw extruder, employing standard molding conditions. For the compositions of Examples I-III and Comparative Experiments A and B, the temperature of the extruded melt was typically about 350-360° C. For Comparative Experiment C the melt temperature was about 330° C. After the melt compounding the resulting melt was extruded into strands, cooled and cut into granules.
Injection Molding—Preparation of Test Bars for Mechanical Testing
Dried granulate material was injection molded into a mold to form test bars conforming ISO 527 type 1A; the thickness of the test bars was 4 mm. The polyamide compositions were injection molded into appropriate test molds using a standard injection molding machine. Test bars were prepared using either a single gated mold for standard test bars or a double gated mold for production of test bars with a weld line, each gate located at an opposite end of the sample and causing the formation of a weld line, while applying the same conditions as for the standard test bars. The setting temperature of the T-melt in the injection molding machine was about 330° C. for PA-1 and 350° C. for PA-2 and PA-3; the temperature of the mold was 140° C.
Testing
Melting temperature (Tm)
The measurements of the melting temperature (Tm) were carried out with a Mettler Toledo Star System (DSC) using a heating and cooling rate of 10° C./min. in an N2 atmosphere. For the measurements a sample of about 5 mg pre-dried powdered polymer was used. The pre-drying was carried out at high vacuum, i.e. less than 50 mbar and a 130° C. during 16 hrs. The sample was heated from 0° C. to a temperature about 30° C. above the melting temperature at 10° C./min, immediately cooled to 0° C. at 10° C./min and subsequently heated to about 30° C. above the melting temperature again at 10° C./min. For the melting temperature Tm the peak value of the melting peak in the second heating cycle was determined, according to the method of ISO-11357-1/3, 2011.
Tensile Strength
The tensile strength was measured in a tensile test according to ISO 527/1 at 150° C., at a drawing speed of 5 mm/min.
Weldline Strength
The weldline strength was measured in a tensile test according to ISO 527/1 at 23° C., at a drawing speed of 5 mm/min.
The compositions and test results have been summarized in Table 1.

TABLE 1

Compositions and properties of Examples I-III and Comparative Experiments (A-C)

| | CE-A | EX-I | CE-B | EX-II | CE-C | EX-III |
|---|---|---|---|---|---|---|
| Composition (wt.%) | | | | | | |
| PA-6T/4T (65/35) | 59.2 | | 54.6 | | | |
| PA-6T/4T/DT (58/32/10) | | 59.5 | | 54.6 | | 49.5 |
| PA-6T/DT (60/40) | | | | | 54.5 | |
| Glass fibers | 40 | 40 | 45 | 45 | 45 | 50 |
| Additive package (ST + MRA) | 0.8 | 0.5 | 0.4 | 0.4 | 0.5 | 0.5 |
| Properties | | | | | | |
| Tm (° C.) | 342 | 337 | 342 | 337 | 300 | 337 |
| Tensile strength at 150° C. [MPa] | 135 | 134.4 | 140 | 136 | 83 | 138 |
| Weldline strength at 23° C. [MPa] | 59.4 | 73.4 | 70 | 78 | 69 | 81 |

The results show an increased weldline strength for the compositions according to the invention, compared to corresponding compositions not comprising 2-methyl-pentamethylene diamine terephthalamide units, while the tensile strength at high temperature remains at a high level. This result is highly surprising and in contrast with the known composition comprising a larger amount of 2-methyl-pentamethylene diamine terephthalamide units, which shows a lower weldline strength and a significant drop in tensile strength at high temperature.

The invention claimed is:
1. A reinforced thermoplastic polymer composition consisting of:
(A) a polymer comprising 30-90 wt. %, based on total weight of the polymer (A), of at least a first semi-crystalline semi-aromatic polyamide (SSPA-1) having a melting temperature (Tm) of at least 300° C.;
(B) 10-70 wt. % of at least one reinforcing agent, and
(C) 0-25 wt. % of one or more other components, wherein the SSPA-1 consists of:
(A-1-a) 90-100 mole % of repeat units derived from (i) aromatic dicarboxylic acid and (ii) diamines, and
(A-1-b) 0-10 mole % of repeat units derived from other monomers; wherein
the diamines (ii) consist of 80-95 mole % of linear aliphatic diamine, 5-20 mole % of 2-methyl-pentamethylene diamine, and 0-10 mole % of other diamines; and wherein
the mole percentages (mole %) of the linear aliphatic diamine, the 2-methyl-pentamethylene diamine and the other diamines are relative to the total molar amount of the diamines (ii);
the mole % of (A-1-a) and (A-1-b) are relative to the total molar amount of monomeric repeat units (A-1-a) and (A1-b) in the SSPA-1;
the weight percentages (wt. %) of the components (A), (B) and (C) are relative to the total weight of the composition, with the sum of the components (A), (B) and (C) being 100 wt. %.
2. The polymer composition according to claim 1, wherein the SSPA-1 has a melting temperature in the range of 310-350° C.
3. The polymer composition according to claim 2, wherein the aromatic dicarboxylic acid is terephthalic acid.
4. The polymer composition according to claim 1, wherein the aromatic dicarboxylic acid is selected from the group consisting of terephthalic acid, 2,6'-naphthalene dicarboxylic acid, 4,4'-biphenyl dicarboxylic acid and combinations thereof.

5. The polymer composition according to claim 1, wherein the diamines (ii) consist of 5-15 mole % of 2-methyl-pentamethylene diamine, 85-95 mole % of a linear aliphatic diamine, and 0-5 mole % of other diamines.

6. The polymer composition according to claim 1, wherein the linear diamines comprise 40-95 mole % of a C2-C8 diamine, relative to the total molar amount of the linear diamines (ii).

7. The polymer composition according to claim 1, wherein the component (B) comprises inorganic fibers and/or inorganic fillers.

8. The polymer composition according to claim 1, wherein the component (B) comprises glass fibers and/or carbon fibers.

9. The polymer composition according to claim 1, wherein the component (B) is present in an amount in the range of 30-50 wt. %, relative to the total weight of the composition.

10. The polymer composition according to claim 1, wherein the linear diamines comprise 60-95 mole % of a C2-C6 diamine, relative to the total molar amount of the linear diamines (ii).

11. A process for preparing a polymer composition according to claim 1, comprising melt-mixing the components (A), (B) and (C).

12. A molded part comprising an element made of the polymer composition according to claim 1.

13. The molded part according to claim 12, wherein the molded part is an automotive part or a part of an electronic device.

14. The molded part according to claim 12, wherein the element is made in a mold with a multi-gate cavity.

15. A process for making a molded part which comprises injection molding the polymer composition according to claim 1 into a mold.

16. The process according to claim 15, wherein the mold comprises a multi-gate cavity.

* * * * *